US008301290B2

(12) United States Patent
Culp et al.

(10) Patent No.: US 8,301,290 B2
(45) Date of Patent: Oct. 30, 2012

(54) SYSTEM AND METHOD FOR CORRECTING SYSTEMATIC PARAMETRIC VARIATIONS ON INTEGRATED CIRCUIT CHIPS IN ORDER TO MINIMIZE CIRCUIT LIMITED YIELD LOSS

(75) Inventors: James A. Culp, Newburgh, NY (US); John J. Ellis-Monaghan, Grand Isle, VT (US); Jeffrey P. Gambino, Westford, VT (US); Kirk D. Peterson, Jericho, VT (US); Jed H. Rankin, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/603,679

(22) Filed: Oct. 22, 2009

(65) Prior Publication Data

US 2011/0098838 A1    Apr. 28, 2011

(51) Int. Cl.
   *G06F 19/00*    (2011.01)
(52) U.S. Cl. ........................................ 700/121; 438/289
(58) Field of Classification Search .................. 700/105, 700/110, 160, 166, 121; 438/289
See application file for complete search history.

(56) References Cited

U.S. PATENT DOCUMENTS

| | | | |
|---|---|---|---|
| 4,434,013 A | 2/1984 | Bol | |
| 6,281,563 B1 | 8/2001 | Wills et al. | |
| 6,448,533 B1 | 9/2002 | Kanayama | |
| 6,514,840 B2 | 2/2003 | Barrett et al. | |
| 6,591,154 B2 | 7/2003 | Haight et al. | |
| 7,153,749 B1 | 12/2006 | Lu et al. | |
| 7,473,622 B2 * | 1/2009 | Yamazaki et al. | 438/487 |
| 2002/0192914 A1 | 12/2002 | Kizilyalli et al. | |
| 2007/0160099 A1 | 7/2007 | Marsh et al. | |
| 2009/0106714 A1 | 4/2009 | Culp et al. | |

FOREIGN PATENT DOCUMENTS

JP    2004329633    11/1992

OTHER PUBLICATIONS

Zomorrodian et al.; "Threshold voltage adjustment on sperical, single-silicon substrates by focused ion beam implantatiion"; American Socitey; Dec. 2006; J. Vac. Sci. Technol.; vol. 24; No. 6; pp. 3221-3226.*
Droes et al.; TFT Threshold Voltage Adjustment with In-situ Doped PVD Silicon Films; SPIE; 2003; vol. 5004; pp. 95-104.*
Uchikoga et al. "Low temperature poly-Si TFT-LCD by excimer laser anneal"; Thin Solid Films; 2001;pp. 19-24.*
Springer et al., "Modeling of Variation in Submicrometer CMOS ULSI Technologies," IEEE Transactions on Electron Devices, vol. 53, No. 9, Sep. 2006.

* cited by examiner

*Primary Examiner* — John R. Cottingham
*Assistant Examiner* — Chad Rapp
(74) *Attorney, Agent, or Firm* — Gibb & Riley, LLC (57) ABSTRACT

Disclosed are a system and a method of correcting systematic, design-based, parametric variations on integrated circuit chips to minimize circuit limited yield loss. Processing information and a map of a chip are stored. The processing information can indicate an impact, on a given device parameter, of changes in a value for a specification associated with a given process step. The map can indicate regional variations in the device parameter (e.g., threshold voltage). Based on the processing information and using the map as a guide, different values for the specification are determined, each to be applied in a different region of the integrated circuit chip during the process step in order to offset the mapped regional parametric variations. A process tool can then be selectively controlled to ensure that during chip manufacturing the process step is performed accordingly and, thereby to ensure that the regional parametric variations are minimized.

24 Claims, 5 Drawing Sheets

SYSTEM AND METHOD FOR CORRECTING SYSTEMATIC PARAMETRIC VARIATIONS ON INTEGRATED CIRCUIT CHIPS IN ORDER TO MINIMIZE CIRCUIT LIMITED YIELD LOSS

BACKGROUND

1. Field of the Invention

The embodiments of the invention generally relate to circuit limited yield loss and, more specifically, to a system and an associated method for correcting systematic parametric variations on integrated circuit chips in order to minimize circuit limited yield loss.

2. Description of the Related Art

Circuit limited yield loss refers to the percentage of integrated circuit chips that, when manufactured according to a given design, will not/do not meet pre-defined performance expectations (e.g., clock frequency and power consumption expectations). Across-chip parametric variations (i.e., across-chip variations in device parameters such as threshold voltage, effective channel length, sheet resistance, drive current, leakage current, etc.) can cause significant variations in device performance and, thereby can cause circuit limited yield loss. Some across-chip parametric variations may be random. That is, they may be unpredictable. However, other across-chip parametric variations may be systematic (i.e., deterministic, predictable, etc.). For example, they may be process-based (i.e., the result of known limits on processing and/or processing controls). Alternatively, they may be design-based (i.e., the result of known design configurations). Typical solutions for systematic parametric variations include process and/or design changes. However, development and implementation of such solutions particularly with respect to design changes are often costly and time consuming. Therefore, it would be advantageous to provide a system and an associated method for correcting systematic parametric variations on integrated circuit chips during manufacture in order to minimize circuit limited yield loss without incurring significant cost and time penalties.

SUMMARY

In view of the foregoing, disclosed herein are embodiments of a system and an associated method of correcting systematic, design-based, parametric variations on integrated circuit chips in order to minimize circuit limited yield loss without incurring significant cost and time penalties. In the embodiments, processing information is stored. This processing information can indicate a relative impact, on a given device parameter, of changes in a value for a specification associated with a given process step. Additionally, a map of an integrated circuit chip is stored. This map can indicate regional variations in the device parameter (e.g., threshold voltage (Vt)). Then, based on the processing information and using the map as a guide, a determination can be made as to different values for specification that can be applied in the different regions of the integrated circuit chip during the process step in order to offset the mapped regional parametric variations. Once this determination is made, a process tool can be selectively controlled in order to ensure that the process step is performed accordingly and, thereby to ensure that the regional parametric variations are minimized (i.e., reduced, limited, essentially eliminated, etc.).

Generally, disclosed herein are embodiments of a system for correcting systematic, design-based, parametric variations (i.e., regional parametric variations) on an integrated circuit chip. The system embodiments can comprise a process tool, a data storage device, a processor and a controller. The process tool can perform a process step during manufacturing of the integrated circuit chip and can be controlled by the controller. The data storage device can store processing information related to the process step. Specifically, the processing information can indicate a relative impact, on a given device parameter, of changes in the value of a specification associated with the process step. The data storage device can also store a map of the integrated circuit chip. Specifically, this map can indicate variations in the given device parameter between different regions of the integrated circuit chip (i.e., regional parametric variations). Then, based on the processing information and using the map as a guide, the processor can determine different values for the process specification, each one to be used in a corresponding one of the different regions of the integrated circuit chip as the process step is performed by the process tool during chip manufacturing in order to offset (i.e., correct for) the mapped regional parametric variations. The controller can receive these different values for the specification and can subsequently control the process tool to ensure that the process step is performed accordingly (i.e., to ensure that the different values for the specification are actually used in the different regions during the process step) and, thereby to ensure that the regional parametric variations are minimized (i.e., reduced, limited, essentially eliminated, etc.).

One exemplary embodiment of such a system for correcting systematic, design-based, parametric variations (i.e., regional parametric variations) on an integrated circuit chip comprises a laser anneal tool, a data storage device, a processor and a controller. The laser anneal tool can perform a laser anneal process during manufacturing of the integrated circuit chip and can be controlled by the controller. The data storage device can store processing information related to the laser anneal process. Specifically, this processing information can indicate a relative impact, on threshold voltage (Vt), of changes in the amount of laser anneal energy applied during a laser anneal process. The data storage device can also store a map of the integrated circuit chip. Specifically, this map can indicate variations in threshold voltage (Vt) between different regions of the integrated circuit chip (i.e., regional Vt variations). Then, based on the processing information and using the map as a guide, the processor can determine different amounts of laser anneal energy, each one to be used in a corresponding one of the different regions of the integrated circuit chip as the laser anneal process is being performed by the laser anneal tool during chip manufacturing in order to offset (i.e., correct for) the mapped regional Vt variations. The controller can receive the different laser anneal energy amounts and can control the laser anneal tool to ensure that the laser anneal process is performed accordingly (i.e., to ensure that the different laser anneal energy amounts are actually used in the different regions during the laser anneal process) and, thereby to ensure that the regional parametric variations are minimized (i.e., reduced, limited, essentially eliminated, etc.).

Also disclosed herein are embodiments of a method for correcting systematic, design-based, parametric variations (i.e., regional parametric variations) on an integrated circuit chip. The method embodiments can comprise accessing, by a processor, processing information and a map of the integrated circuit chip. The processing information can indicate a relative impact, on a given device parameter, of changes in the value of a specification associated with a process step. The map can indicate variations in the given device parameter between different regions of the integrated circuit chip (i.e., regional parametric variations). Next, based on the processing information and using the map as a guide, different values for the specification can be determined by the processor, each one of the different values to be used in a corresponding one of the different regions of the integrated circuit chip as the process step is performed during chip manufacturing in order to offset the regional parametric variations. During manufacturing of the integrated circuit chip, these different values for the specification can be received by a controller, which in turn controls the process tool that performs the process step to ensure that the different values for the specification are actually used in the different regions and, thereby to ensure that the regional parametric variations are minimized (i.e., reduced, limited, essentially eliminated, etc.).

One exemplary embodiment of such a method for correcting systematic, design-based, parametric variations (i.e., regional parametric variations) on an integrated circuit chip comprises accessing, by a processor, processing information and a map of the integrated circuit chip. The processing information can indicate a relative impact, on threshold voltage (Vt), of changes in the amount of laser anneal energy applied during a laser anneal process. The map can indicate variations in Vt between different regions of the integrated circuit chip (i.e., regional Vt variations). Next, based on the processing information and using the map as a guide, different amounts for the laser anneal energy can be determined by the processor, each one of the different amounts to be used in a corresponding one of the different regions of the integrated circuit chip as the laser anneal process is performed during chip manufacturing in order to offset the regional Vt variations. During manufacturing of the integrated circuit chip, these different laser anneal energy amounts can be received by a controller, which in turn controls the laser anneal tool that performs the laser anneal process to ensure that the different laser anneal amounts are actually applied in the different regions and, thereby to ensure that the regional Vt variations are minimized (i.e., reduced, limited, essentially eliminated, etc.).

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, circuit limited yield loss refers to the percentage of integrated circuit chips that, when manufactured according to a given design, will not/do not meet predefined performance expectations (e.g., clock frequency and power consumption expectations). Across-chip parametric variations (i.e., across-chip variations in a device parameter, such as threshold voltage, effective channel length, sheet resistance, drive current, leakage current, etc.) can cause significant variations in device performance and, thereby can cause circuit limited yield loss. Some across-chip parametric variations may be random. That is, they may be unpredictable. Others may be systematic (i.e., deterministic, predictable, etc.) and either process-based or design-based.

Process-based parametric variations are the result of limits on processing and/or processing controls. For example, they may be the result of limits on controlling deposition rates, lithographic dimensions, feature alignment, etc. Since such variations are due to processing and/or processing controls, they are distributed throughout the integrated circuit chip and are, thus, not regional.

Design-based parametric variations are the result of design configurations (e.g., different polysilicon perimeter densities in different regions of an integrated circuit chip, different reflectance and absorption characteristics in different regions of an integrated circuit chip, different voltage droops in different regions of an integrated circuit chip, etc.). For example, regional differences in polysilicon perimeter density (i.e., regional differences in the sum of the perimeter of the polysilicon shapes, such as gate structures) can result in regional differences in average threshold voltage and/or average effective channel length. Specifically, when polysilicon perimeter density is relatively high in a region, devices in that region will have relatively thin dielectric spacers and, thereby relatively low threshold voltages and relatively short effective channel lengths. On the other hand, when polysilicon perimeter density is relatively low in a region, devices in that region will have relatively thick dielectric spacers and, thereby relatively high threshold voltages and relatively long effective channel lengths. Also, for example, regional differences in reflectance and absorption characteristics can result in regional differences in threshold voltages, sheet resistances, drive currents, leakage currents, etc. Specifically, regional differences in reflectance and absorption characteristics can result in regional differences in rapid thermal anneal (RTA) temperatures (e.g., differences of up to 10° C. or more). Variations in the RTA temperatures can result in variations in dopant activation, damage repair, etc. across the chip and can, thereby cause variations in threshold voltages, sheet resistances, drive currents, leakage currents, etc.

Typical solutions for systematic parametric variations include process and/or design changes. However, development and implementation of such solutions particularly with respect to design changes are often costly and time consuming. Therefore, it would be advantageous to provide a system and an associated method for correcting systematic parametric variations on integrated circuit chips during manufacture in order to minimize circuit limited yield loss without incurring significant cost and time penalties.

In view of the foregoing, disclosed herein are embodiments of a system and an associated method of correcting systematic, design-based, parametric variations on integrated circuit chips in order to minimize circuit limited yield loss without incurring significant cost and time penalties. In the embodiments, processing information is stored. This processing information can indicate a relative impact, on a given device parameter, of changes in the value for a specification associated with a given process step. Additionally, a map of an integrated circuit chip is stored. This map can indicate regional variations in the device parameter (e.g., average threshold voltage (Vt)). Then, based on the processing information and using the map as a guide, a determination can be made as to different values for the specification that can be applied in the different regions of the integrated circuit chip during the process step in order to offset the mapped regional parametric variations. Once this determination is made, a process tool can be selectively controlled in order to ensure that the process step is performed accordingly and, thereby to ensure that the regional parametric variations are minimized (i.e., reduced, limited, essentially eliminated, etc.).

Figure 1:
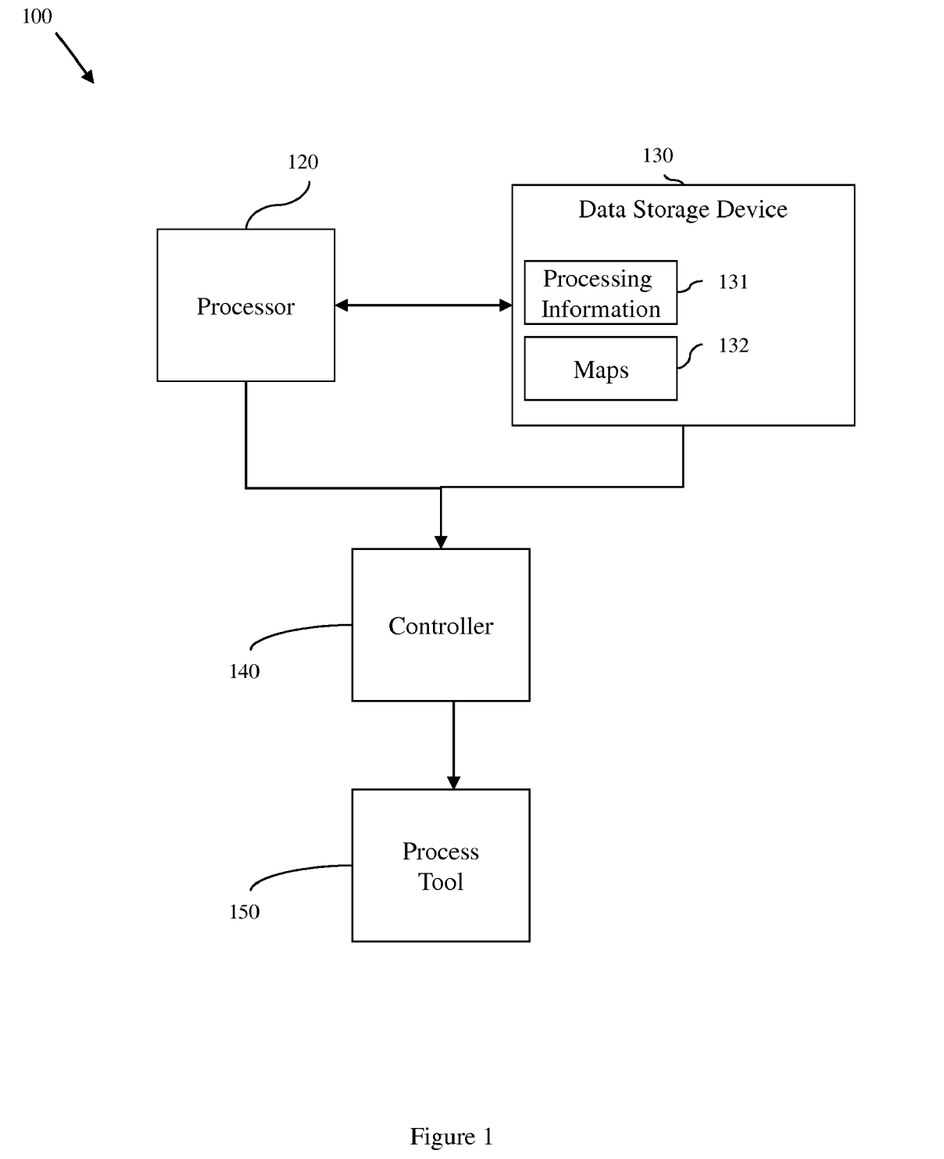
FIG. 1 is a schematic diagram illustrating embodiments of a system for correcting systematic, design-based, parametric variations on integrated circuit chips.

Generally, referring to FIG. 1, disclosed herein are embodiments of a system 100 for correcting systematic, design-based, parametric variations (i.e., regional parametric variations) on an integrated circuit chip being manufactured according to a particular design. The system 100 embodiments can comprise a process tool 150, a controller 140, a data storage device 130 and a processor 120.

The process tool 150 can perform (i.e., can be adapted to perform, configured to perform, etc.) a particular process step during manufacturing of the integrated circuit chip. For example, in one exemplary embodiment, the process tool 150 can comprise a laser anneal tool that is used to perform a laser anneal process. In another exemplary embodiment, the process tool 150 can comprise a dopant ion implantation tool that is used to perform a source/drain dopant ion implantation process.

The data storage device 130 can store (i.e., can be adapted to store, configured to store, etc.) processing information 131 related to the particular process step. Specifically, the processing information 131 can indicate a known relative impact, on a given device parameter (e.g., threshold voltage, effective channel length, sheet resistance, drive current, leakage current, etc.), of changes in the value of a specification that is associated with the particular process step.

For example, in one exemplary embodiment, the device parameter can comprise threshold voltage (Vt), the process tool 150 can comprise a laser anneal process tool and the specification can comprise the amount of laser anneal energy. Thus, the processing information 131 can indicate a known relative impact, on threshold voltage (Vt), of changes in the amount of laser anneal energy applied during a laser anneal process. That is, the processing information 131 can provide details showing how the amount of laser anneal energy associated with the laser anneal process can be selectively increased or decreased in order to selectively decrease or increase, respectively, the threshold voltage (Vt).

In another exemplary embodiment, the device parameter can comprise threshold voltage (Vt), the process tool 150 can comprise a dopant ion implantation tool and the specification can comprise a dopant dose. Thus, the processing information 131 can indicate a known relative impact, on threshold voltage (Vt), of changes in the dopant dose used during a source/drain dopant ion implantation process. That is, the processing information 131 can provide details showing how the dopant dose can be selectively increased or decreased during a source/drain region dopant ion implant process in order to selectively increase or decrease, respectively, the threshold voltage (Vt).

Figure 2:
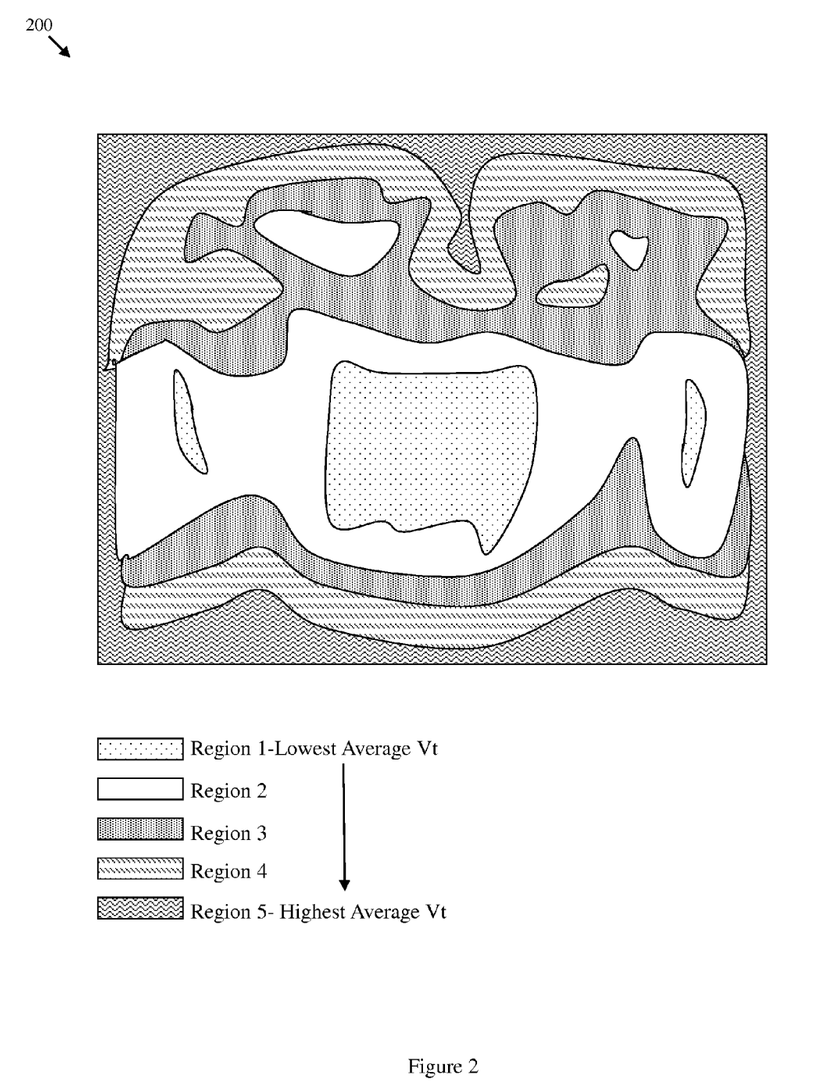
FIG. 2 is an illustration of an exemplary map showing regional parametric variations.

The data storage device 130 can also store a map 132 of the integrated circuit chip, as designed. Specifically, this map 132 can indicate variations in the given device parameter between different regions of the integrated circuit chip (i.e., regional parametric variations). FIG. 2 shows an exemplary map 200 of an integrated circuit chip illustrating defined regions 1-5 on an integrated circuit chip, with each region having a different average value for a given device parametric. In this case, the device parametric is threshold voltage (Vt) and the average threshold voltage (Vt) of the devices in any one region is different from the average threshold voltage (Vt) of the devices in any other region. Region 1 shown in the center of the map has the lowest average Vt and region 5 shown at the edges of the map has the highest average Vt.

Such a map can be generated empirically. That is, test chip(s) can be manufactured according to the design and tested so that the given device parameter for each of the devices on the test chip(s) can be measured. By analyzing the measured values for the device parameter across the test chip(s), a determination can be made as to whether there are any regional variations in the device parameter (i.e., whether the average value for the device parameter varies in different regions of the chip) and such regional variations can be mapped.

Alternatively, such a map can be generated by modeling the design. Such modeling can account for at least one systematic, design-based, phenomenon that impacts the device parameter and, preferably, can account for all such phenomena. For example, in the case of threshold voltage (Vt), this systematic, design-based, phenomenon can comprise: regional variations in polysilicon perimeter density, regional variations in reflectance and absorption characteristics, regional variations in voltage droop and/or regional variations in any other known systematic, design-based phenomena. One exemplary technique that can be used to generate such a map is disclosed in U.S. patent application Ser. No. 11/876, 853, of Culp et al., filed on Oct. 23, 2007 (U.S. Publication No.: 2009/0106714, published on Apr. 23, 2009), assigned to International Business Machines Corporation, and incorporated herein in its entirety by reference.

Based on the processing information 131 and using the map 132 as a guide, the processor 120 can determine different values for the process specification, each one to be used in a corresponding one of the different regions of the integrated circuit chip (e.g., see regions 1-5 of the chip map shown in FIG. 2) as the process step is performed by the process tool 150, during chip manufacturing, in order to offset (i.e., correct for) the mapped regional parametric variations. For example, in one exemplary embodiment, the processor 120 can determine different laser anneal energy amounts, each one to be used in a corresponding one of the different regions of the integrated circuit chip as the laser anneal process is being performed by the laser anneal tool, during chip manufacturing, in order to offset (i.e., correct for) the mapped regional Vt variations. In another exemplary embodiment, the processor 120 can determine different dopant doses for the source/drain dopant ion implantation process, each one to be used in a corresponding one of the different regions of the integrated circuit chip as the source/drain dopant ion implantation process is performed by the dopant ion implantation tool, during chip manufacturing, in order to offset (i.e., correct for) the mapped regional Vt variations.

The controller 140 can control (i.e., can be adapt to control, configured to control, etc.) one or more processing tools and, particularly, the process tool 150, to be used in manufacturing the integrated circuit chip. The controller 140 can receive a report setting out the different values for the specification and where they are to be applied. For example, report may be automatically communicated to the controller 140 from the processor 120. Alternatively, the information may be stored in a data storage device (e.g., data storage device 130 or some other data storage device) and subsequently communicated to, input into, accessed by or otherwise made available for use by the controller 140 on demand or upon some triggering event (e.g., activation of the process tool 150). The controller 140 can then control the process tool 150 to ensure that the process step is performed accordingly (i.e., to ensure that the different values for the specification are actually used in the different regions during the process step) and, thereby to ensure that the regional parametric variations are minimized (i.e., reduced, limited, essentially eliminated, etc.).

For example, in the case of different amounts of laser anneal energy, the controller 140 can receive a report setting out these different amounts and where they are to be applied. The controller 140 can then control the laser anneal tool to ensure that the laser anneal process is performed accordingly (i.e., to ensure that, as the laser of the laser anneal tool scans across the wafer during chip manufacturing, the different laser anneal energy amounts are actually used in the different regions) and, thereby to ensure that the regional parametric variations are minimized (i.e., reduced, limited, essentially eliminated, etc.). Those skilled in the art will recognize that the ability of the laser anneal tool to modulate the laser anneal energy as the laser scans over the different regions is necessarily a function of the laser spot size (e.g., because a spot size that is too large may overlap the surface are of multiple regions, preventing localized application of different laser anneal energies). Thus, the laser anneal tool can comprise a laser with an adjustable spot size to accommodate modulating the laser anneal energy in the different region. In this case, either the processor 130 or controller 140 can determine an optimal spot size for the laser based on the sizes of the different regions (i.e., the spot size should be smaller than the lowest spatial frequency of effects on the map) so that the different laser anneal energy amounts can be selectively applied to the different regions as defined on the map. The optimal spot size can then be communicated to the laser anneal tool and the laser anneal tool can automatically set the adjustable spot size to be equal to or approximately equal to the optimal spot size.

Similarly, in the case of different dopant doses, the controller 140 can receive a report setting out the different dopant doses and where they are to be applied. The controller 140 can then control the ion implantation tool to ensure that the ion implantation process is performed accordingly and, thereby to ensure that the regional parametric variations are minimized (i.e., reduced, limited, essentially eliminated, etc.). It should be understood that the ion implantation tool must be specifically configured to allow for modulations in dopant dose from region to region.

Figure 3:
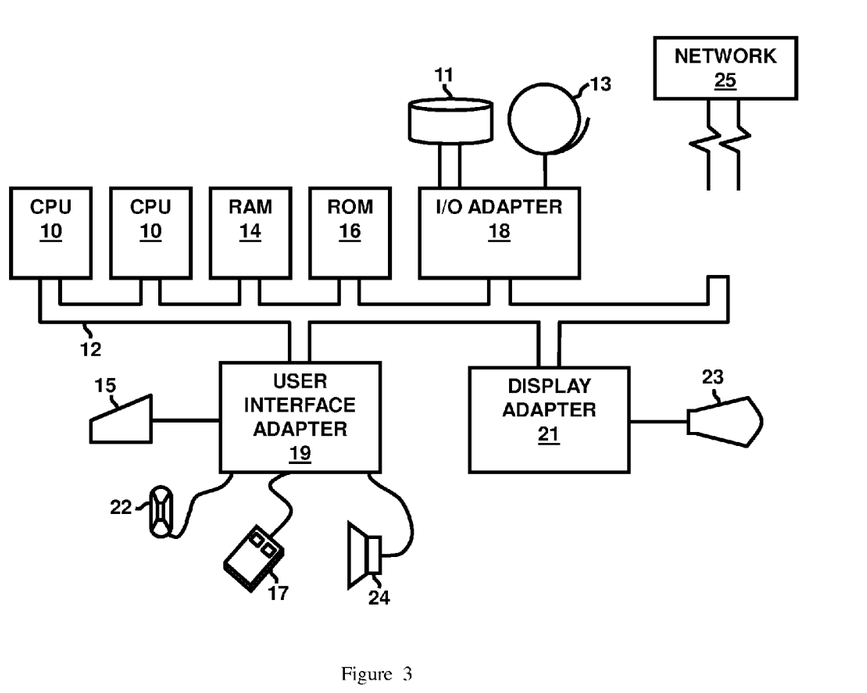
FIG. 3 is a schematic diagram illustrating an exemplary hardware environment that can be used to implement the embodiments disclosed herein.

Finally, in the embodiments of the system 100 illustrated in FIG. 1, the processor 120, controller 140 and data storage device 130 are illustrated as discrete components. However, it should be understood that, in the system 100 all of these components may be incorporated into a single computer system (e.g., as illustrated in FIG. 3 and described in detail below) or, alternatively, any one or more of these components may be incorporated into separate but interconnected, computer systems.

Figure 4:
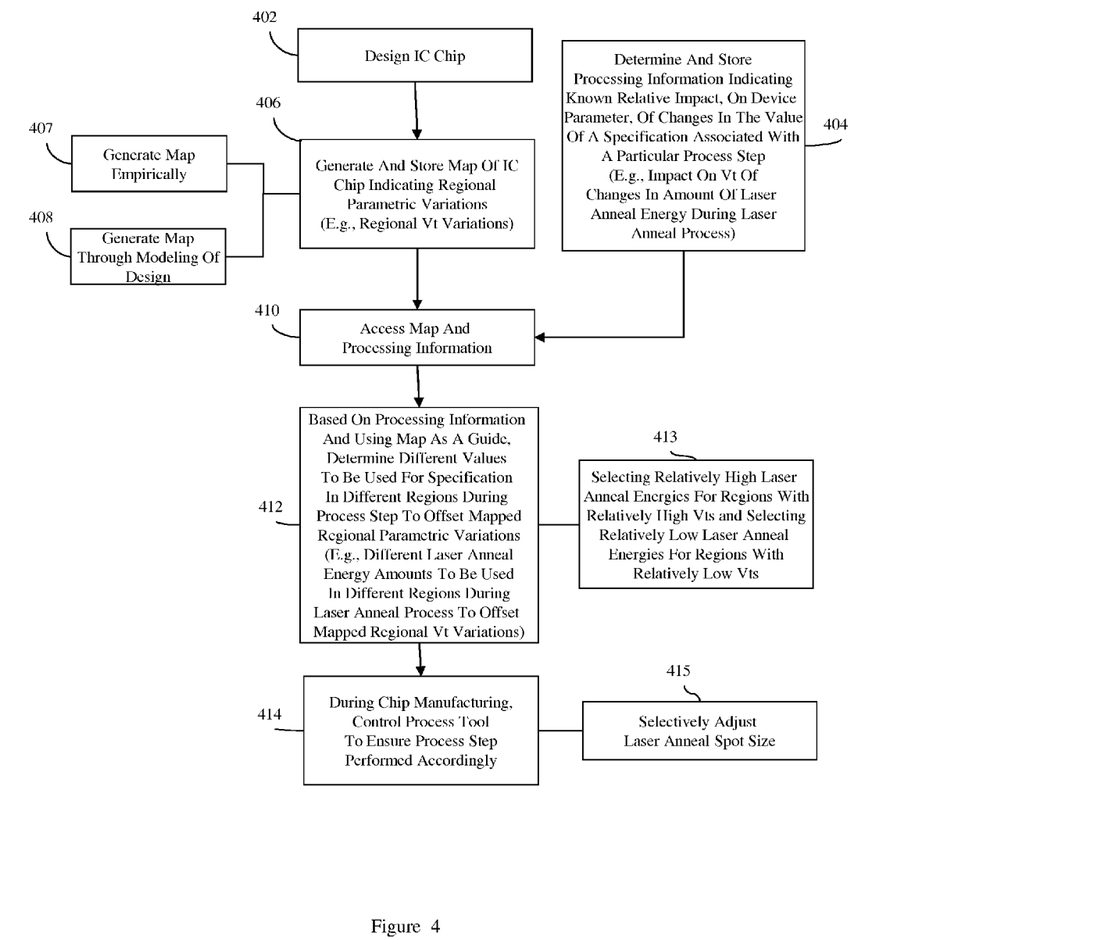
FIG. 4 is a flow diagram illustrating embodiments of a method for correcting systematic, design-based, parametric variations on integrated circuit chips.

Referring to the flow diagram of FIG. 4 in combination with FIG. 1, also disclosed herein are embodiments of a method for correcting systematic, design-based, parametric variations (i.e., regional parametric variations) on an integrated circuit chip. The method embodiments can comprise designing an integrated circuit chip (402) using a conventional design flow process to generate a final design that will be released to manufacturing (see design flow diagram of FIG. 5 that is described in detail below). The final design can include all data and instructions required for manufacturing the designed integrated circuit chip, including but not limited to, information such as, symbolic data, map files, test data files, design content files, manufacturing data, layout parameters, wires, levels of metal, vias, shapes, data for routing through the manufacturing line and specifications for use with processing tools within the manufacturing line. However, prior to outputting the final design, the method embodiments disclosed herein perform a number of additional steps within the design flow process, namely, identifying systematic, parametric variations (i.e., regional parametric variations) that would otherwise be present on the integrated circuit chip as a result of the design and determining appropriate corrective measures for minimizing (i.e., reducing, limiting, essentially eliminating, etc.) such regional parametric variations. The method embodiments will also include additional steps during chip manufacturing to ensure that such corrective measures are implemented.

Specifically, processing information 131 can be determined and stored (e.g., in the data storage device 131) (404). This processing information 131 can indicate a known relative impact, on a given device parameter (e.g., threshold voltage, effective channel length, sheet resistance, drive current, leakage current, etc.), of changes in the value of a particular specification that is associated with a particular process step.

For example, in one exemplary embodiment, the device parameter can comprise threshold voltage (Vt), the process tool 150 can comprise a laser anneal process tool and the specification can comprise the amount of laser anneal energy. Thus, the processing information 131 can indicate a known relative impact, on threshold voltage (Vt), of changes in the amount of laser anneal energy applied during a laser anneal process. That is, the processing information 131 can provide details showing how the amount of laser anneal energy associated with the laser anneal process can be selectively increased or decreased in order to selectively decrease or increase, respectively, the threshold voltage (Vt).

In another exemplary embodiment, the device parameter can comprise threshold voltage (Vt), the process tool 150 can comprise a dopant ion implantation tool and the specification can comprise a dopant dose. Thus, the processing information 131 can indicate a known relative impact, on threshold voltage (Vt), of changes in the dopant dose used during a source/drain dopant ion implantation process. That is, the processing information 131 can provide details showing how the dopant dose can be selectively increased or decreased during a source/drain region dopant ion implant process in order to selectively increase or decrease, respectively, the threshold voltage (Vt).

Additionally, a map 132 of the integrated circuit chip can be generated such that the map indicates variations in the given device parameter between different regions of the integrated circuit chip (i.e., regional parametric variations) (406). That is, the map 132 can identify systematic, parametric variations (i.e., regional parametric variations) that are present on the integrated circuit chip as a result of the design. FIG. 2 shows an exemplary map 200 of an integrated circuit chip illustrating defined regions 1-5 on an integrated circuit chip, with each region having a different average value for a device parametric. In this case, the average threshold voltage (Vt) of the devices in any one region are different from the average threshold voltage (Vt) of the devices in any other region, e.g., region 1 is illustrated as having the lowest average Vt and region 5 the highest average Vt.

Such a map can be generated empirically (407). That is, test chip(s) can be manufactured according to the design and tested so that the given device parameter for each of the devices on the test chip(s) can be measured. By analyzing the measured values for the device parameter across the test chip(s), a determination can be made as to whether there are any regional variations in the device parameter (i.e., whether the average value for the device parameter varies in different regions of the chip) and such regional variations can be mapped.

Alternatively, such a map can be generated by modeling the design (408). Such modeling can account for at least one systematic, design-based, phenomenon that impacts the device parameter and, preferably, can account for all such phenomena. For example, in the case of threshold voltage (Vt), this systematic, design-based, phenomenon can comprise: regional variations in polysilicon perimeter density, regional variations in reflectance and absorption characteristics, regional variations in voltage droop and/or regional variations in any other known systematic, design-based phenomena. One exemplary technique that can be used to generate such a map is disclosed in U.S. patent application Ser. No. 11/876,853, of Culp et al., filed on Oct. 23, 2007, assigned to International Business Machines Corporation, and incorporated herein in its entirety by reference.

Then, the processing information 131 and the map 132 of the integrated circuit chip, can be accessed and analyzed (e.g., by a process) to determine appropriate corrective measures for minimizing (i.e., reducing, limiting, essentially eliminating, etc.) such regional parametric variations (410). Specifically, based on the processing information 131 and using the map 132 as a guide, different values for the process step specification can be determined, each one to be used in a corresponding one of the different regions of the integrated circuit chip (e.g., see regions 1-5 of the chip map shown in FIG. 2) as the process step is being performed by the process tool 150, during chip manufacturing, in order to offset (i.e., correct for) the mapped regional parametric variations (412).

For example, in one exemplary embodiment, different laser anneal energy amounts can be determined, each one to be used in a corresponding one of the different regions of the integrated circuit chip as the laser anneal process is being performed by the laser anneal tool during chip manufacturing in order to offset (i.e., correct for) the mapped regional Vt variations. This process can comprise selecting relatively high laser anneal energies for regions on the map having relatively high threshold voltages in order to decrease the relatively high threshold voltages and selecting relatively low laser anneal energies for regions on the map having relatively low threshold voltages in order to increase the relatively low threshold voltages (413). In another exemplary embodiment, different dopant doses for the source/drain dopant ion implantation process can be determined, each one to be used in a corresponding one of the different regions of the integrated circuit chip as the source/drain dopant ion implantation process is performed. This process can comprise selecting a relatively low dopant dose for regions on the map having relatively high threshold voltages in order to decrease the relatively high threshold voltages and selecting a relatively high dopant dose for regions on the map having relatively low threshold voltages in order to increase the relatively low threshold voltages.

The method embodiments can further comprise, receiving (e.g., by a controller 140 that will control the processing tool 150) a report setting out these different values and where on the chip they should be applied. For example, the different values may be automatically communicated to the controller 140. Alternatively, the different values may be stored in a data storage device (e.g., data storage device 130 or some other data storage device) as part of the final design structure, which is released to manufacturing and subsequently communicated to, input into, accessed by or otherwise made available for use by the controller 140 on demand or upon some triggering event (e.g., activation of the process tool 150). The process tool 150 can then be controlled (e.g., by the controller) during chip manufacturing to ensure that the process step is performed accordingly (i.e., to ensure that the different values for the specification are actually used in the different regions during the process step) and, thereby to ensure that the regional parametric variations are minimized (i.e., reduced, limited, essentially eliminated, etc.) (414).

For example, in the case of different amounts of laser anneal energy, a report setting out these different amounts can be received and the laser anneal tool can be controlled (e.g., by the controller 140) to ensure that the laser anneal process is performed accordingly (i.e., to ensure that, as the laser of the laser anneal tool scans across the wafer during chip manufacturing, the different laser anneal energy amounts are actually used in the different regions) and, thereby to ensure that the regional parametric variations are minimized (i.e., reduced, limited, essentially eliminated, etc.). Those skilled in the art will recognize that the ability of the laser anneal tool to modulate the laser anneal energy as the laser scans over the different regions is necessarily a function of the laser spot size because a spot size that is too large may overlap the surface are of multiple regions. Thus, in this case, the method embodiments can further comprise selectively adjusting the spot size of a laser in the laser anneal tool based on the sizes of the different regions (i.e., the spot size should be smaller than the lowest spatial frequency of effects on the map) in order to accommodate modulation of the laser energy in the different regions (415). This can be accomplished, for example, by first determining (e.g., by the controller) an optimal spot size for applying the different laser anneal energy amounts to the different regions. This optimal spot size can then be communicated to the laser anneal tool, which has a laser with an adjustable spot size and which can automatically set the adjustable spot size to be approximately equal to the optimal spot size.

Similarly, in the case of different dopant doses, a report setting out these different doses can be received and the ion implantation tool can be controlled (e.g., by the controller 140) to ensure that the ion implantation process is performed accordingly and, thereby to ensure that the regional parametric variations are minimized (i.e., reduced, limited, essentially eliminated, etc.). The implantation tool must be specifically configured to allow for modulations in dopant dose from region to region.

It should be understood that the embodiments of the invention describe above can take the form of an entirely hardware embodiment, an entirely software embodiment or an embodiment including both hardware and software elements. In one embodiment, the invention is implemented in software, which includes but is not limited to firmware, resident software, microcode, etc. Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

As mentioned above, FIG. 3 is a schematic drawing illustrating a representative hardware configuration for a computer system that can be used to implement the embodiments described herein. This computer system can comprise one or more processors or central processing units (CPU) 10. The CPUs 10 can be interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other data and program storage devices that are readable by the computer system. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. Such a computer system can read data and inventive instructions stored on the data and program storage devices and cam follow these instructions to execute the methodology of the embodiments of the invention.

Also, as mentioned above, FIG. 5 shows a block diagram of an exemplary design flow 500 that can be used in conjunction with the embodiments described herein. Such a design flow 500 includes processes, machines and/or mechanisms for processing design structures or devices to generate logically or otherwise functionally equivalent representations thereof. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Figure 5:
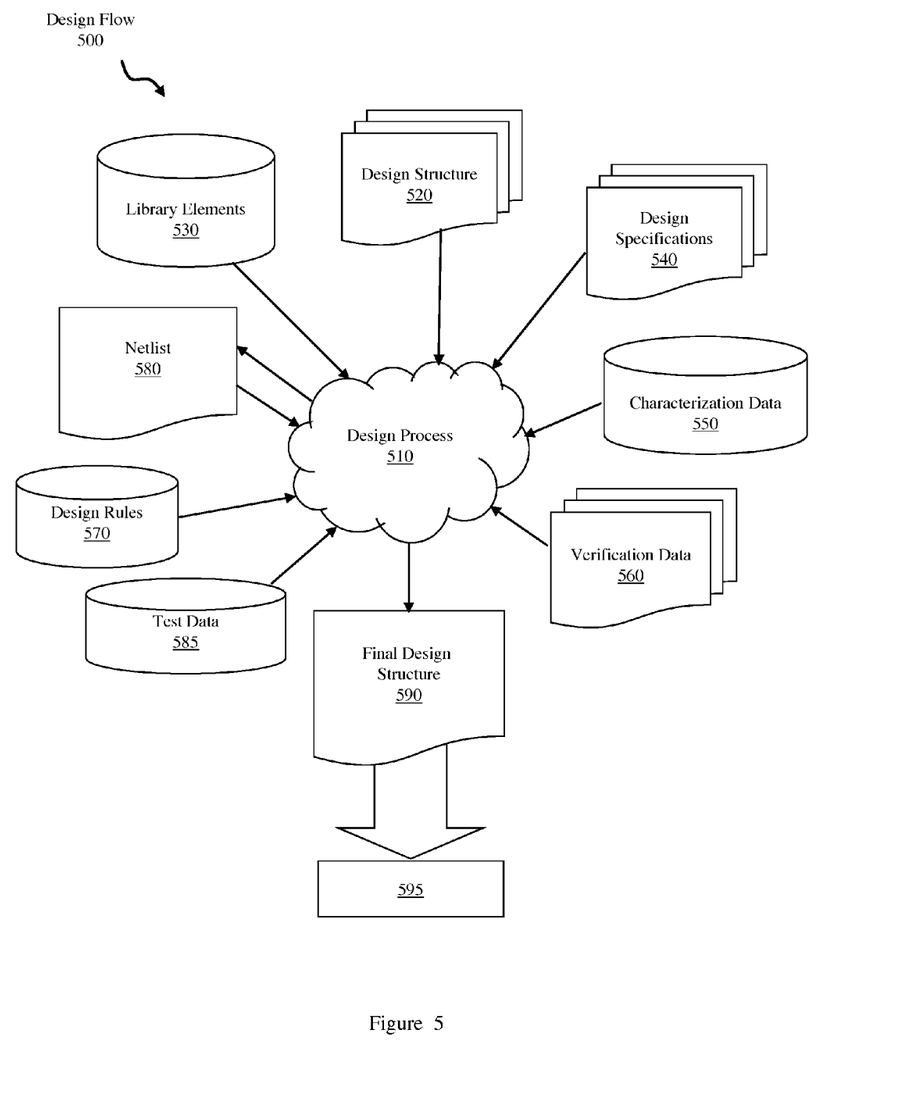
FIG. 5 is diagram of an exemplary design flow process used in semiconductor design, manufacture, and/or test.

Design flow 500 may vary depending on the type of representation being designed. For example, a design flow 500 for building an application specific IC (ASIC) may differ from a design flow 500 for designing a standard component or from a design flow 500 or instantiating the design into a programmable array, for example a programmable gate array (PGA) or a field programmable gate array (FPGA) offered by Altera® Inc. or Xilinx® Inc.

For example, a conventional design flow process 500, as illustrated in FIG. 5, comprises multiple such design structures including an input design structure 520 that is preferably processed by a design process 510 in order to output a final design structure 590 to manufacturing, etc. The input design structure 520 may be a logical simulation design structure generated and processed by design process to produce a logically equivalent functional representation of the integrated circuit chip. The input design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent the integrated circuit chip. As such, design structure 520 may comprise files or other data structures including human and/or machine-readable source code, compiled structures, and computer-executable code structures that, when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures in the integrated circuit chip in order to generate a netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc. Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system generate a logically or otherwise functionally equivalent form of the integrated circuit chip. In one embodiment, design structure 590 may comprise a compiled, executable HDL simulation model that functionally simulates the devices of the integrated circuit chip.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce the integrated circuit chip, including different values for process specifications to be used on different regions of the device to offset mapped parametric variations (as determined at process 412). Design structure 590 may then proceed to a stage 595 where, for example, design structure 590: proceeds to tape-out, is released to manufacturing, is released to a mask house, is sent to another design house, is sent back to the customer, etc.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Disclosed above are embodiments of a system and an associated method of correcting systematic, design-based, parametric variations on integrated circuit chips in order to minimize circuit limited yield loss without incurring significant cost and time penalties. In the embodiments, processing information is stored. This processing information can indicate a relative impact, on a given device parameter, of changes in the value of a specification associated with a given process step. Additionally, a map of an integrated circuit chip is stored. This map can indicate regional variations in the device parameter (e.g., threshold voltage (Vt)). Then, based on the processing information and using the map as a guide, a determination can be made as to different values for specification that can be applied in the different regions of the integrated circuit chip during the process step in order to offset the mapped regional parametric variations. Once this determination is made, a process tool can be selectively controlled in order to ensure that the process step is performed accordingly and, thereby to ensure that the regional parametric variations are minimized (i.e., reduced, limited, essentially eliminated, etc.). Thus, in the embodiments, the recipe for a given process step (e.g., a laser anneal process) becomes a function of the geometric region for which a particular process specification (e.g., a laser anneal energy) is specifically calibrated in order to offset device parameter detractors and, preferably, to offset the sum of all device parameter detractors, as determined through modeling. Consequently, the embodiments are able to correct for long range systematic phenomenon that degrade the accuracy of calibrated electrical models and, thus, the embodiments allow for better (i.e., more accurate) predictions of performance (e.g., clock frequency and power consumption).

What is claimed is:

1. A system for correcting systematic parametric variations on an integrated circuit chip, said system comprising:
   a process tool;
   a data storage device storing a map of an integrated circuit chip, said integrated circuit chip having a given design and comprising a plurality of devices, said map indicating variations in a device parameter for said devices across different regions of said integrated circuit chip as a result of said given design, and said data storage device further storing information indicating a relative impact, on said device parameter, of changes in a specification associated with a process step performed by said process tool in manufacturing said integrated circuit chip according to said given design;

a processor accessing said data storage device and determining, based on said information and using said map as a guide, different values for said specification, each one of said different values for said specification to be used in a corresponding one of said different regions as said process step is performed by said process tool during said manufacturing of said integrated circuit chip according to said given design in order to offset said variations in said device parameter; and a controller receiving said different values for said specification and controlling said process tool as said process step is performed by said process tool during said manufacturing of said integrated circuit chip according to said given design such that said different values for said specification are used in said different regions.

2. The system of claim 1, said map being generated empirically.

3. The system of claim 1, said map being generated based on modeling of said given design.

4. The system of claim 1, said device parameter comprising threshold voltage, said process tool comprising a laser anneal process tool and said specification comprising an anneal energy.

5. The system of claim 1, said device parameter comprising threshold voltage, said process tool comprising an ion implantation tool and said specification comprising a dopant dose.

6. A system for correcting systematic parametric variations on an integrated circuit chip, said system comprising:

a laser anneal tool;

a data storage device storing a map of an integrated circuit chip, said integrated circuit chip having a given design and comprising a plurality of devices, said map indicating variations in threshold voltage for said devices across different regions of said integrated circuit chip as a result of said given design, said data storage device further storing information indicating a relative impact, on said threshold voltage, of changes in an amount of laser anneal energy associated with a laser anneal process performed by said laser anneal tool in manufacturing said integrated circuit chip according to said given design;

a processor accessing said data storage device and determining, based on said information and using said map as a guide, different laser anneal energy amounts, each one of said different laser anneal energy amounts to be used in a corresponding one of said different regions as said laser anneal process is performed by said laser anneal tool during said manufacturing of said integrated circuit chip according to said given design in order to offset said variations in said threshold voltage; and a controller receiving said different values for said laser anneal energy and controlling said laser anneal tool as said laser anneal process is performed by said laser anneal tool during said manufacturing of said integrated circuit chip according to said given design such that said different values for said laser anneal energy are used in said different regions.

7. The system of claim 6, said map being generated empirically.

8. The system of claim 6, said map being generated based on modeling of said given design and said modeling accounting for at least one systematic, design-based phenomenon that impacts said threshold voltage.

9. The system of claim 8, said at least one systematic, design-based, phenomenon comprising any of regional variations in polysilicon perimeter density, regional variations in reflectance and absorption characteristics, and regional variations in voltage droop.

10. The system of claim 6, said laser anneal tool comprising a laser with an adjustable spot size to accommodate modulating laser anneal energy in said different regions.

11. The system of claim 6, said different laser anneal energy amounts comprising relatively high laser anneal energies for regions on said map having relatively high threshold voltages in order to decrease said relatively high threshold voltages and relatively low laser anneal energies for regions on said map having relatively low threshold voltages in order to increase said relatively low threshold voltages.

12. A method of correcting systematic parametric variations on an integrated circuit chip, said method comprising:

generating, and storing in a data storage device, a map of an integrated circuit chip,
said integrated circuit chip having a given design and comprising a plurality of devices, and
said map indicating variations in a device parameter for said devices across different regions of said integrated circuit chip as a result of said given design;

accessing, by a processor from said data storage device, said map and information indicating a relative impact, on said device parameter, of changes in a specification associated with a process step used in manufacturing said integrated circuit chip according to said given design; and based on said information and using said map as a guide, determining, by said processor, different values for said specification, each one of said different values to be used in a corresponding one of said different regions as said process step is performed during said manufacturing of said integrated circuit chip according to said given design in order to offset said variations in said device parameter.

13. The method of claim 12, further comprising:

receiving, by a controller, said different values for said specification; and during manufacturing of said integrated circuit chip, controlling, by said controller, a process tool performing said process step such that said different values for said specification are used in said different regions.

14. The method of claim 12, said map being generated empirically.

15. The method of claim 12, said map being generated based on modeling of said given design.

16. The method of claim 12, said device parameter comprising threshold voltage, said process step comprising a laser anneal process and said specification comprising a laser anneal energy.

17. The method of claim 12, said device parameter comprising threshold voltage, said process step comprising an implantation process and said specification comprising a dopant dose.

18. A method of correcting systematic parametric variations on an integrated circuit chip, said method comprising:

generating, and storing in a data storage device, a map of an integrated circuit chip,
said integrated circuit chip having a given design and comprising a plurality of devices, and said map indicating variations in threshold voltage for said devices across different regions of said integrated circuit chip as a result of said given design;

accessing, by a processor from said data storage device, said map and information indicating a relative impact, on said threshold voltage, of changes in an amount of laser anneal energy associated with a laser anneal process used in manufacturing said integrated circuit chip according to said given design; and based on said information and using said map as a guide, determining, by said processor, different laser anneal energy amounts, each one of said different laser anneal energy amounts to be used in a corresponding one of said different regions as said laser anneal process is performed during manufacturing of said integrated circuit chip according to said given design in order to offset said variations in said threshold voltage.

19. The method of claim 18, further comprising:

receiving, by a controller, said different laser anneal energy amounts; and during manufacturing of said integrated circuit chip, controlling, by said controller, a laser anneal tool performing said laser anneal process such that said different laser anneal energy amounts are used in said different regions.

20. The method of claim 18, said map being generated empirically.

21. The method of claim 18, said map being generated based on modeling of said given design and said modeling accounting for at least one systematic, design-based, phenomenon that impacts said threshold voltage.

22. The method of claim 21, said at least one systematic, design-based, phenomenon comprising any of regional variations in polysilicon perimeter density, regional variations in reflectance and absorption characteristics, and regional variations in voltage droop.

23. The method of claim 18, further comprising, selectively adjusting a spot size of a laser in said laser anneal tool to accommodate modulating said laser anneal energy in said different regions.

24. The method of claim 18, said determining of said different laser anneal energy amounts comprising selecting relatively high laser anneal energies for regions on said map having relatively high threshold voltages in order to decrease said relatively high threshold voltages and selecting relatively low laser anneal energies for regions on said map having relatively low threshold voltages in order to increase said relatively low threshold voltages.

* * * * *